US012148328B2

(12) United States Patent
Luo

(10) Patent No.: US 12,148,328 B2
(45) Date of Patent: Nov. 19, 2024

(54) SPLICED SCREEN AND DISPLAY DEVICE

(71) Applicants: HUIZHOU CHINA STAR OPTOELECTRONICS DISPLAY CO., LTD., Guangdong (CN); TCL CHINA STAR OPTOELECTRONICS TECHNOLOGY CO., LTD., Guangdong (CN)

(72) Inventor: Ping Luo, Guangdong (CN)

(73) Assignees: HUIZHOU CHINA STAR OPTOELECTRONICS DISPLAY CO., LTD., Guangdong (CN); TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/597,954

(22) PCT Filed: Jan. 14, 2022

(86) PCT No.: PCT/CN2022/071997
§ 371 (c)(1),
(2) Date: Jan. 30, 2022

(87) PCT Pub. No.: WO2023/123572
PCT Pub. Date: Jul. 6, 2023

(65) Prior Publication Data

US 2024/0046824 A1 Feb. 8, 2024

(30) Foreign Application Priority Data

Dec. 27, 2021 (CN) .......................... 202111613011.3

(51) Int. Cl.
*G09F 9/302* (2006.01)
*G09F 9/33* (2006.01)

(52) U.S. Cl.
CPC .............. *G09F 9/3026* (2013.01); *G09F 9/33* (2013.01)

(58) Field of Classification Search
CPC ................ G06F 3/1446; G06F 1/1658; G09G 2300/026; G09G 3/32–3291;
(Continued)

(56) References Cited

U.S. PATENT DOCUMENTS

2003/0011303 A1 1/2003 Matthies et al.
2012/0001830 A1 1/2012 Xia et al.
(Continued)

FOREIGN PATENT DOCUMENTS

CN 107610596 A 1/2018
CN 108230913 A 6/2018
(Continued)

OTHER PUBLICATIONS

International Search Report in International application No. PCT/CN2022/071997, mailed on Aug. 25, 2022.
(Continued)

*Primary Examiner* — Amr A Awad
*Assistant Examiner* — Aaron Midkiff
(74) *Attorney, Agent, or Firm* — PV IP PC; Wei Te Chung

(57) ABSTRACT

A spliced screen and a display device are disclosed. The spliced screen includes: a spliced unit screen, wherein the spliced unit screen includes a plurality of unit screens, and a splicing gap is defined between the unit screens adjacent to each other; a light-emitting diode (LED) strip light, wherein the LED strip light is disposed on the splicing gap; and a light-emitting cover plate, wherein the light-emitting cover plate is disposed above the spliced unit screen. By disposing the light-transmitting cover plate, the splicing gap between the unit screens adjacent to each other can be
(Continued)

eliminated by the LED strip light without forming an uneven display surface of the spliced screen. Therefore, an entire visual effect of the spliced screen is improved.

17 Claims, 1 Drawing Sheet

(58) Field of Classification Search
CPC ........... G02F 1/13336; G02F 1/133331; G02F 2201/44; G02F 1/133308; G02F 1/133328; G09F 9/3026; G09F 9/33; G09F 9/335; H10K 59/18; G02B 1/133528; G02B 5/02–0294
USPC ........................................................... 345/1.3
See application file for complete search history.

(56) References Cited

U.S. PATENT DOCUMENTS

2016/0198578 A1* 7/2016 Du ............................ G09F 9/30 361/679.01
2016/0266437 A1* 9/2016 Liu ................... G02F 1/133524
2019/0339570 A1* 11/2019 Chen .................... H10K 59/128
2020/0026110 A1* 1/2020 Pyo ................... G02F 1/133308
2021/0109389 A1* 4/2021 Fan ........................ G02F 1/1362

FOREIGN PATENT DOCUMENTS

CN 209343699 U 9/2019
CN 209785470 U 12/2019
CN 111048000 A 4/2020
CN 111653207 A 9/2020
CN 212161167 U 12/2020
CN 212516414 U 2/2021
CN 112863390 A 5/2021

OTHER PUBLICATIONS

Written Opinion of the International Search Authority in International application No. PCT/CN2022/071997, mailed on Aug. 25, 2022.
Chinese Office Action issued in corresponding Chinese Patent Application No. 202111613011.3 dated Jul. 26, 2022, pp. 1-6.

* cited by examiner

SPLICED SCREEN AND DISPLAY DEVICE

CROSS REFERENCE TO RELATED APPLICATIONS

This application claims priority of Chinese Application No. 202111613011.3, filed on Dec. 27, 2021 and entitled "SPLICED SCREEN AND DISPLAY DEVICE", the disclosure of which is incorporated by reference in its entirety.

FIELD

The present disclosure relates to a field of display technologies, and more particularly, to a spliced screen and a display device.

BACKGROUND

As science and technology grow by leaps and bounds, more and more technology products are launched in our daily lives, e.g., outdoor display devices such as light-emitting diode (LED) display screens and liquid crystal display (LCD) screens. Conventional LCDs have not only low cost but also high resolution. However, a splicing gap between the conventional LCDs spliced to each other cannot be eliminated, affecting a visual effect.

Regarding the technical issue:

Currently, to solve an issue of a splicing gap of spliced screens affecting a visual effect, an LED strip light is spliced to an LED screen. This can completely eliminate the splicing gap. However, because the LED strip light is attached to a spliced unit, a height of the LED strip light is greater than a height of the spliced unit, leading to a height difference between the LED strip light and the spliced unit. As such, an entire visual effect of spliced screens is affected.

SUMMARY

The present disclosure provides a spliced screen and a display device. By disposing a light-transmitting cover plate, a splicing gap between unit screens adjacent to each other can be eliminated by an LED strip light without forming an uneven display surface of the spliced screen, thereby improving an entire visual effect of the spliced screen.

In one aspect, the present disclosure provides a spliced screen, including:

- a spliced unit screen, wherein the spliced unit screen includes a plurality of unit screens, and a splicing gap is defined the spliced units adjacent to each other;
- a light-emitting diode (LED) strip light disposed on the splicing gap; and
- a light-transmitting cover plate disposed above the spliced unit screen.

By disposing the light-transmitting cover plate on the spliced unit screen, the splicing gap between the unit screens adjacent to each other can be eliminated by the LED strip light without forming an uneven display surface of the spliced screen. Therefore, a technical issue of an entire visual effect of the spliced screen being affected due to a height difference formed between the LED strip light and the spliced unit is prevented. As such, an entire flatness of the spliced screen is improved, and a visual effect is enhanced.

In one achievable embodiment, the spliced screen further includes a support connector, and the support connector is disposed between the light-transmitting cover plate and the spliced unit screen.

The support connector supports the light-transmitting cover plate and limits a position of the light-transmitting cover plate, thereby ensuring stability of the light-transmitting cover plate being mounted. Also, a certain distance is defined between the light-transmitting cover plate and the spliced unit screen, thereby preventing the spliced unit screen from being damaged by an impact force due to an external force applied to the light-transmitting cover plate. As such, the spliced unit screen can be protected.

In one achievable embodiment, a height of the support connector relative to the spliced unit screen is not less than a height of the LED strip light relative to the spliced unit screen, and the support connector is disposed at a periphery of the spliced unit screen.

By making the height of the support connector relative to the spliced unit screen not less than a height of the LED strip light relative to the spliced unit screen, the light-transmitting cover plate can be prevented from being limited by the height of the LED strip light. By disposing the support connector at the periphery of the spliced unit screen, the LED strip light and a display function of the spliced unit screen can be prevented from being affected by the support connector.

In one achievable embodiment, the support connector is rectangularly donut-shaped.

By making the support connector be rectangularly donut-shaped, support stability of the support connector can be ensured. Therefore, the light-transmitting cover plate will not be unstable due to forces unevenly applied thereto when it is supported by the support connector.

In one achievable embodiment, an end of the support connector facing the light-transmitting cover plate is provided with a first adhesive layer, and an end of the support connector facing the spliced unit screen is provided with a second adhesive layer.

Because of the first adhesive layer and the second adhesive layer, a position of the glass cover plate to be mounted can be confined. Furthermore, a structure thereof is simple.

In one achievable embodiment, the light-transmitting cover plate is a glass cover plate.

In one achievable embodiment, the support connector includes a transparent material.

Because the supporting connector includes the transparent material, a display function of the spliced unit screen will not be blocked and affected.

In one achievable embodiment, the light-transmitting cover plate includes a first cover plate area and a second cover plate area, the first cover plate area is defined right above the spliced unit screen, the second cover plate area is defined right above the LED strip light, a thickness of the second cover plate area is less than a thickness of the first cover plate area, a recess is formed on a surface of the second cover plate area facing the LED strip light and on the first cover plate area, a distance between the first cover plate area and the spliced unit screen is equal to a distance between the second cover plater area and the LED strip light, and a refractive index of the first cover plate area is equal to a refractive index of the second cover plate area.

The light-transmitting cover plate includes the first cover plate area and the second cover plate area having different thicknesses. Furthermore, because the recess is formed in the surface of the second cover plate area facing the LED strip light and on the first cover plate area, which have different thicknesses, the distance between the LED strip light and the second cover plate area is increased. Therefore, the distance between the first cover plate area and the spliced screen can be equal to the distance between the second cover plate area and the LED strip light. A visual error caused by different refraction optical paths due to the distance between the first cover plate area and the spliced unit screen different from the distance between the second cover plate area and the LED strip light can be prevented. Furthermore, because the refractive index of the first cover plate area is equal to the refractive index of the second cover plate area, a visual error issue caused by different refraction optical paths is further prevented.

In one achievable embodiment, the light-transmitting cover plate is disposed right above the spliced unit screen, a position of the light-transmitting cover plate corresponding to the LED strip light is provided with a position-bypassing opening, the LED strip light is disposed in the position-bypassing opening, and the LED strip light is aligned with the light-transmitting cover plate.

The light-transmitting cover plate is disposed right above the spliced unit screen, the position of the light-transmitting cover plate corresponding to the LED strip light is provided with the position-bypassing opening, the LED strip light is disposed in the position-bypassing opening, and the LED strip light is aligned with the light-transmitting cover plate. Therefore, when a height difference issue caused by the height of the LED strip light greater than the height of the LED strip light is solved, an entire thickness of the spliced screen can be prevented from being increased due to the light-transmitting cover plate.

In one achievable embodiment, the spliced screen includes a position-confining component, the position-confining component is disposed at a periphery of the spliced unit screen, and the light-transmitting cover plate is disposed on a top part of the position-confining component.

Because of the position-confining component, not only can be spliced unit screen be protected, but the light-transmitting cover plate can also be mounted. Furthermore, by adjusting the height of the position-confining component to adjust the distance between the light-transmitting cover plate and the spliced unit screen, the light-transmitting cover plate can be mounted more flexibly and can have more functions. Moreover, applied forces received by the cover plate are released by the position-confining component and will not be applied to the spliced unit screen, thereby protecting the spliced unit screen.

In one achievable embodiment, the support connector includes a hollow structure.

Because the support connector includes the hollow structure, an entire mass is reduced. Furthermore, light is less blocked by the support connector when the spliced screen is viewed from a lateral side. Thus, a display effect is improved.

In one achievable embodiment, the support connector includes a plurality of support blocks spaced apart from each other.

The support connector includes the plurality of support blocks spaced apart from each other. Therefore, an entire mass is reduced. Furthermore, light is less blocked by the support connector when the spliced screen is viewed from a lateral side. Thus, a display effect is improved.

In another aspect, the present disclosure provides a spliced screen, including:

- a spliced unit screen, wherein the spliced unit screen includes a plurality of unit screens, and a splicing gap is defined the spliced units adjacent to each other;
- a light-emitting diode (LED) strip light disposed on the splicing gap; and
- a light-transmitting cover plate disposed above the spliced unit screen.
- a support connector disposed between the light-transmitting cover plate and the spliced unit screen; wherein the light-transmitting cover plate is a glass cover plate, and the support connector includes a transparent material; and
- an end of the support connector facing the light-transmitting cover plate is provided with a first adhesive layer, and an end of the support connector facing the spliced unit screen is provided with a second adhesive layer.

In one achievable embodiment, the light-transmitting cover plate is disposed right above the spliced unit screen, a position of the light-transmitting cover plate corresponding to the LED strip light is provided with a position-bypassing opening, the LED strip light is disposed in the position-bypassing opening, and the LED strip light is aligned with the light-transmitting cover plate.

In one achievable embodiment, the spliced screen includes a position-confining component, the position-confining component is disposed at a periphery of the spliced unit screen, and the light-transmitting cover plate is disposed on a top part of the position-confining component.

In one achievable embodiment, a height of the support connector relative to the spliced unit screen is not less than a height of the LED strip light relative to the spliced unit screen, and the support connector is disposed at a periphery of the spliced unit screen.

In one achievable embodiment, the support connector is rectangularly donut-shaped.

In one achievable embodiment, the light-transmitting cover plate includes a first cover plate area and a second cover plate area, the first cover plate area is defined right above the spliced unit screen, the second cover plate area is defined right above the LED strip light, a thickness of the second cover plate area is less than a thickness of the first cover plate area, a recess is formed on a surface of the second cover plate area facing the LED strip light and on the first cover plate area, a distance between the first cover plate area and the spliced unit screen is equal to a distance between the second cover plater area and the LED strip light, and a refractive index of the first cover plate area is equal to a refractive index of the second cover plate area.

In one achievable embodiment, the support connector includes a hollow structure.

In yet another aspect, the present disclosure provides a display device, including the spliced screen.

Regarding the beneficial effects:

In the present disclosure, by disposing a light-transmitting cover plate on a spliced unit screen, a splicing gap between unit screens adjacent to each other can be eliminated by an LED strip light without forming an uneven display surface of a spliced screen. Therefore, a technical issue of an entire visual effect of the spliced screen being affected due to a height difference formed between the LED strip light and the spliced unit is prevented. As such, an entire flatness of the spliced screen is improved, and a visual effect is enhanced.

DESCRIPTION OF DRAWINGS

The accompanying figures to be used in the description of embodiments of the present disclosure or prior art will be described in brief to more clearly illustrate the technical solutions of the embodiments or the prior art. The accompanying figures described below are only part of the embodiments of the present disclosure, from which those skilled in the art can derive further figures without making any inventive efforts.

Figure 1:
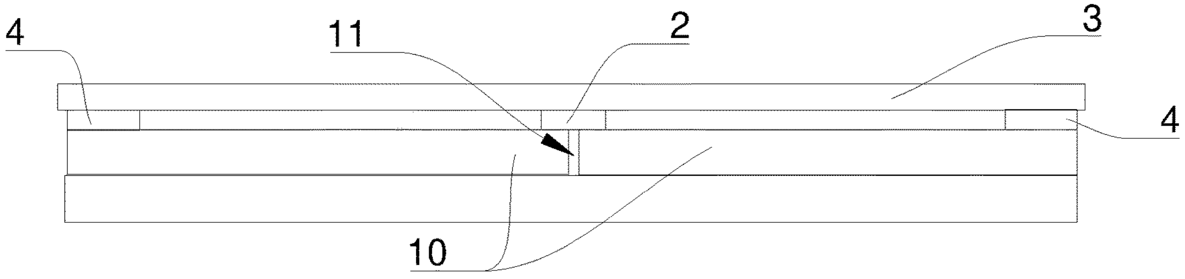
FIG. 1 is a structural schematic view showing a spliced screen provided by an embodiment of the present disclosure.

Reference numbers in the drawings: unit screen 10, splicing gap 11, LED strip light 2, light-transmitting cover plate 3, first cover plate area 30, second cover plate area 31, recess 32, position-bypassing opening 33, support connector 4.

DETAILED DESCRIPTION

Hereinafter preferred embodiments of the present disclosure will be described with reference to the accompanying drawings to exemplify the embodiments of the present disclosure can be implemented, which can fully describe the technical contents of the present disclosure to make the technical content of the present disclosure clearer and easy to understand. However, the described embodiments are only some of the embodiments of the present disclosure, but not all of the embodiments. All other embodiments obtained by those skilled in the art based on the embodiments of the present disclosure without creative efforts are within the scope of the present disclosure.

In the description of the present disclosure, it should be understood that terms such as "center", "longitudinal", "lateral", "length", "width", "thickness", "upper", "lower", "front", "rear", "left", "right", "vertical", "horizontal", "top", "bottom", "inside", "outside", as well as derivative thereof should be construed to refer to the orientation as then described or as shown in the drawings under discussion. These relative terms are for convenience of description, do not require that the present disclosure be constructed or operated in a particular orientation, and shall not be construed as causing limitations to the present disclosure. In addition, terms such as "first" and "second" are used herein for purposes of description and are not intended to indicate or imply relative importance or significance. Thus, features limited by "first" and "second" are intended to indicate or imply including one or more than one these features. In the description of the present disclosure, "a plurality of" relates to two or more than two, unless otherwise specified.

In the description of the present disclosure, it should be noted that unless there are express rules and limitations, the terms such as "mount," "connect," and "bond" should be comprehended in broad sense. For example, it can mean a permanent connection, a detachable connection, or an integrated connection; it can mean a mechanical connection, an electrical connection, or can communicate with each other; it can mean a direct connection, an indirect connection by an intermediate, or an inner communication or an interaction between two elements. A person skilled in the art should understand the specific meanings in the present disclosure according to specific situations.

In the description of the present disclosure, unless specified or limited otherwise, it should be noted that, a structure in which a first feature is "on" or "beneath" a second feature may include an embodiment in which the first feature directly contacts the second feature and may also include an embodiment in which an additional feature is formed between the first feature and the second feature so that the first feature does not directly contact the second feature. Furthermore, a first feature "on," "above," or "on top of" a second feature may include an embodiment in which the first feature is right "on," "above," or "on top of" the second feature and may also include an embodiment in which the first feature is not right "on," "above," or "on top of" the second feature, or just means that the first feature has a sea level elevation greater than the sea level elevation of the second feature. While first feature "beneath," "below," or "on bottom of" a second feature may include an embodiment in which the first feature is right "beneath," "below," or "on bottom of" the second feature and may also include an embodiment in which the first feature is not right "beneath," "below," or "on bottom of" the second feature, or just means that the first feature has a sea level elevation less than the sea level elevation of the second feature.

The disclosure below provides many different embodiments or examples for realizing different structures of the present disclosure. In order to simplify the disclosure of the present disclosure, components and settings of specific examples are described below. Of course, they are only examples and are not intended to limit the present disclosure. Furthermore, reference numbers and/or letters may be repeated in different examples of the present disclosure. Such repetitions are for simplification and clearness, which per se do not indicate the relations of the discussed embodiments and/or settings. Moreover, the present disclosure provides examples of various specific processes and materials, but the applicability of other processes and/or application of other materials may be appreciated by a person skilled in the art.

In the present disclosure, the word "exemplary" is used herein to mean "serving as an example, instance, or illustration." Any embodiment described herein as "exemplary" is not necessarily to be construed as preferred or advantageous over other embodiments. Descriptions are provided to make any skilled in the art able to realize and utilize the present disclosure. In the following descriptions, details are listed for the purpose of illustration. It should be noted that those skilled in the art may realize the present disclosure without using the specific details. In other embodiments, conventional structures and processes are not be illustrated in detail to prevent the illustration of the present disclosure from being complicated due to unnecessary details. Therefore, exemplary embodiments are consistent with principles and features, which are interpreted broadly, disclosed by the present disclosure but shall not be regarded as limitations of the present disclosure.

Conventionally, when an LED screen is spliced to a liquid crystal screen, a height of an LED strip light is greater than a spliced unit because the LED strip light is attached to the spliced unit. Therefore, a height difference is formed between the LED strip light and the spliced unit, affecting an entire visual effect of the spliced screen. Embodiments of the present disclosure are configured to solve the above technical issue.

Please refer to FIG. 1, the present disclosure provides a spliced screen, including a spliced unit screen, an LED strip light 2, and a light-transmitting cover plate 3. The spliced unit screen includes a plurality of unit screens 10. A splicing gap 11 is defined between the unit screens 10 adjacent to each other. The LED strip light 2 is disposed on the splicing gap 11. The light-transmitting cover plate 3 is disposed above the spliced unit screen.

An embodiment of the present disclosure provides a spliced screen. By disposing the light-transmitting cover plate 3 on the spliced unit screen, the splicing gap 11 between the unit screens 10 adjacent to each other can be eliminated by the LED strip light 2 without forming an uneven display surface of the spliced screen. Therefore, a technical issue of an entire visual effect of the spliced screen being affected due to a height difference formed between the LED strip light and the spliced unit is prevented. As such, an entire flatness of the spliced screen is improved, and a visual effect is enhanced.

It should be understood that a light-emitting surface of the LED strip light 2 and a light-emitting surface of the spliced unit screen are defined on a same surface to ensure a display function. In the present embodiment, the light-emitting surface of the LED strip light 2 faces the light-transmitting cover plate 3, and the light-emitting surface (display surface) of the spliced unit screen faces the light-transmitting cover plate 3. It should be understood by those skilled in the art that the spliced unit screen and luminousness of the LED strip light 2 will not be affected when the light-transmitting cover plate 3 is disposed on the light-emitting surface. The light-transmitting cover plate 3 may be a glass cover plate or a polyethene (PE) cover plate, which is not limited by the present disclosure.

It should be understood that the spliced unit screen may be an LCD screen or an organic light-emitting diode (OLED) screen. A number of the unit screens 10 of the spliced unit screen can be determined according to a size of the spliced unit screen desired to be obtained and a size of each of the unit screens 10. Furthermore, the size of each of the unit screens 10 is not limited here. The size of each of the unit screens 10 can be same or different, and can be adjusted according to actual design requirements.

It should be understood that the LED strip light 2 may be a mini LED strip light or a normal LED strip light. Specifically, a width of the LED strip light 2 can be determined according to a size of the splicing gap 11 defined between the unit screens 10 adjacent to each other. The LED strip light 2 can be mounted on the splicing gap 11 by an adhesive layer. A conductive line of the LED strip light 2 can be arranged in the splicing gap 11.

It should be understood that the light-transmitting cover plate 3 may be entirely and directly disposed above the spliced unit screen and the LED strip light 2. Alternatively, the light-transmitting cover plate 3 may have a position-bypassing structure, a position-bypassing recess, or a position-bypassing opening corresponding to the LED strip light 2, which is not limited by the present disclosure.

Figure 2:
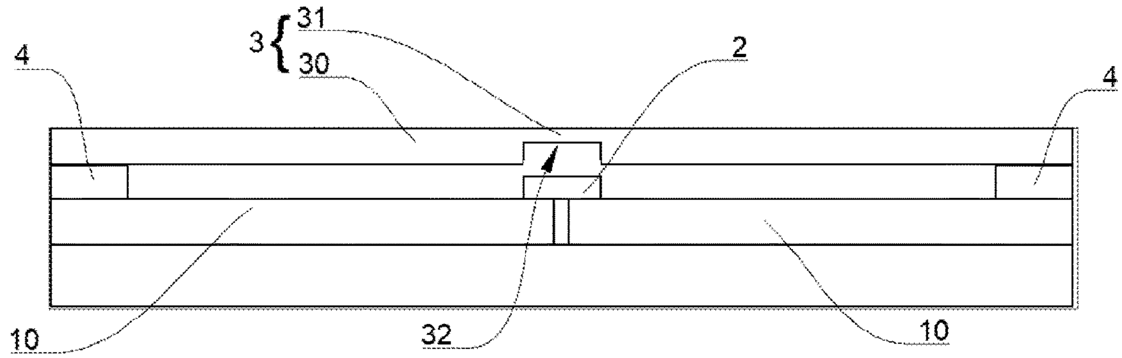
FIG. 2 is a structural schematic view showing a spliced screen provided by another embodiment of the present disclosure.

Please refer to FIG. 2, in one embodiment of the present disclosure, the light-transmitting cover plate 3 includes a first cover plate area 30 and a second cover plate area 31. The first cover plate area 30 is defined right above the spliced unit screen. The second cover plate area 31 is defined right above the LED strip light 2. A thickness of the second cover plate area 31 is less than a thickness of the first cover plate area 30. Furthermore, a recess 32 is formed on a surface of the second cover plate 31 facing the LED strip light 2 and on the first cover plate area 30. A distance between the first cover plate area 30 and the spliced unit screen is equal to a distance between the second cover plate area 31 and the LED strip light 2. Moreover, a refractive index of the first cover plate area 30 is equal to a refractive index of the second cover plate area 31.

The light-transmitting cover plate includes the first cover plate area 30 and the second cover plate area 31 having different thicknesses. Furthermore, because the recess 32 is formed in the surface of the second cover plate area 31 facing the LED strip light and on the first cover plate area 30, which have different thicknesses, a distance between the LED strip light and the second cover plate area 31 is increased. Therefore, a distance between the first cover plate area 30 and the spliced screen can be equal to the distance between the second cover plate area 31 and the LED strip light. Thus, a visual error caused by different refraction optical paths due to the distance between the cover plate area and the spliced unit screen different from the distance between the cover plate area and the LED strip light can be prevented. Furthermore, because the refractive index of the first cover plate area 30 is equal to the refractive index of the second cover plate area 31, a visual error issue caused by different refraction optical paths is further prevented.

It should be understood that the first cover plate area 30 and the second cover plate area 31 can be made of materials having different refractive indexes. Alternatively, they may be made of same materials, and a material molecule that can increase a refractive index is added into the second cover plate area to ensure that a refractive index of the first cover plate area 30 and a refractive index of the second cover plate area 31 are equal. Specifically, the material of the first cover plate area 30 and the material of the second cover plate area 31 are not limited by the present disclosure.

Furthermore, a thickness of the second cover plate area 31 is less than a thickness of the first cover plate area 30. Moreover, the recess 2 is formed on the surface of the second cover plate area 31 facing the LED strip light 2 and on the first cover plate area 30. That is, the first cover plate area 30 defined at a periphery of the second cover plate area 31 forms a wall of the recess 32, and the second cover plate area 31 forms a bottom of the recess 32. In addition, a bottom surface of the recess 32 faces the LED strip light 2. It should be understood that, in some embodiments of the present disclosure, the LED strip light 2 may be defined in the recess 32 and spaced apart from the second cover plate area 31. That is, light is emitted from a top part of the LED strip light 2 (a side facing the second cover plate area 31), and will not affect light emitted from the first cover plate area 30. By disposing the LED strip light 2 in the recess 32, a distance between the light-transmitting cover plate 3 and the spliced unit screen can be reduced, thereby further reducing a distance between the LED strip light 2 and the light-transmitting cover plate 3. Therefore, an entire thickness of the spliced screen can be reduced, and performance of the spliced screen can be improved. In other embodiments of the present disclosure, the LED strip light 2 can also be disposed under the recess 32 and is not disposed in the recess 32, which can be adjusted according to actual applications and requirements and is not limited by the present disclosure.

It should be understood that, in the embodiment of the present disclosure, the light-transmitting cover plate 3 may also be not provided with the recess 32. Instead, optical paths are adjusted by the first cover plate 30 and the second cover plate having different refractive indexes, thereby preventing a visual error due to light emitted from the light-emitting cover plate 3 being affected.

Figure 3:
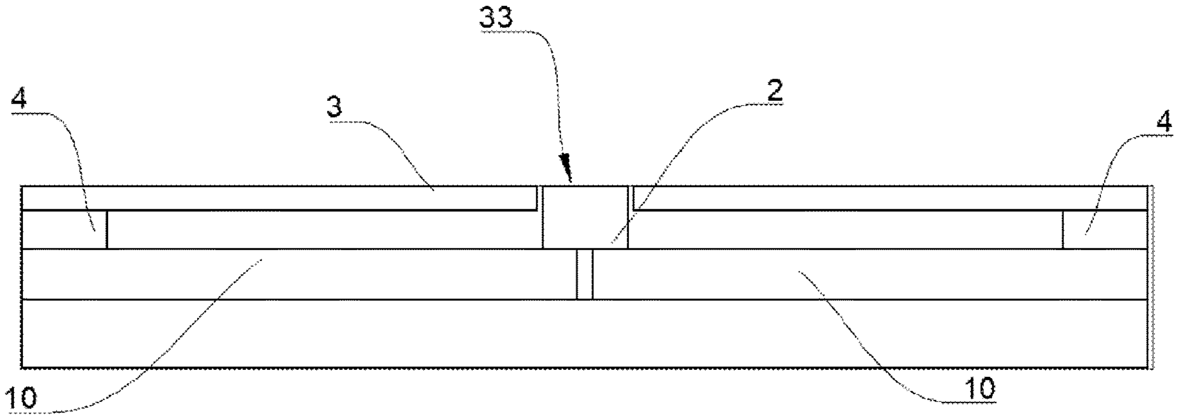
FIG. 3 is a structural schematic view showing a spliced screen provided by yet another embodiment of the present disclosure.

In other embodiments of the present disclosure, as shown in FIG. 3, a position of the light-transmitting cover plate 3 right above the spliced unit screen and corresponding to the LED strip light 2 is provided with a position-bypassing opening 33. The LED strip light 2 is disposed in the position-bypassing opening 33 and is aligned with the light-transmitting cover plate 3. By defining the position-bypassing opening 32 configured to contain the LED strip light 2 in the position of the light-transmitting cover plate 3 corresponding to the LED strip light 2, wherein the LED strip light 2 is aligned with the light-transmitting cover plate 3, not only can a height difference issue between the LED strip light 2 and the spliced unit 1 caused by the LED strip light 2 higher than the spliced unit 1 be solved, but an entire thickness of the spliced screen can also be prevented from being too great due to the light-transmitting cover plate 3.

The position of the light-transmitting cover plate 3 right above the spliced unit screen and corresponding to the LED strip light 2 is provided with the position-bypassing opening 33. That is, a surface of the light-transmitting cover plate 3 facing the LED strip light 2 and a surface of the light-transmitting cover plate 3 away from the LED strip light 2 are communicated to form the position-bypassing opening. The light-transmitting cover plate 3 is not disposed on the LED strip light 2.

In the present embodiment, the spliced screen further includes a support connector 4. The support connector 4 is disposed between the light-transmitting cover plate 3 and the spliced unit screen. The support connector 4 supports the light-transmitting cover plate 3. It should be understood that the LED strip light 2 itself is very narrow, and therefore is probably crushed by the light-transmitting cover plate 3. By disposing the support connector 4 to support the LED strip light 2, the LED strip light 2 can be prevented from being damaged due to external forces, and stability of the light-transmitting cover plate 3 can be ensured when it is mounted.

The support connector 4 may have a hollow structure or may be formed from a plurality of support blocks spaced apart from each other. Therefore, not only can support, connecting, and position-bypassing functions be realized, but a mass can also be reduced. Furthermore, light can be less blocked by the support connector 4 when the spliced device is viewed from a lateral side, thereby improving a display effect.

In other embodiments of the present disclosure, the support connector 4 may not be provided. Instead, a plurality of position-confining components are disposed at a periphery of the spliced unit screen, thereby protecting the spliced unit screen. In addition, the light-transmitting cover plate 3 is disposed on a top part of the spliced unit screen. By disposing the position-confining components, not only can the spliced unit screen be protected, but the light-transmitting cover plate 3 can also be mounted. Moreover, by adjusting a height of the position-confining components to adjust a distance between the light-transmitting cover plate 3 and the spliced unit screen, the light-emitting cover plate 3 can be mounted more flexibly and can have more functions. Furthermore, applied forces received by the cover plate are released by the position-confining components and will not be applied to the spliced unit screen, thereby protecting the spliced unit screen. It should be understood that a length and a width of an orthographic projection of the light-transmitting cover plate 3 are greater than a length and a width of the spliced unit screen.

In other embodiments of the present disclosure, if the light-transmitting cover plate 3 is disposed right above the spliced unit screen and the position of the light-transmitting cover plate 3 corresponding to the LED strip light 3 is provided with the position-bypassing opening 33, the support connector 4 may not be provided. Instead, the light-transmitting cover plate 3 is directly disposed on the spliced unit screen.

In the present embodiment, a height of the support connector 4 relative to the spliced unit screen is not less than a height of the LED strip light 2 relative to the spliced unit screen. That is, the height of the support connector 4 relative to the spliced unit screen may be greater than or equal to the height of the LED strip light 2 relative to the spliced unit screen.

It should be understood that the support connector 4 is mainly configured to support the light-transmitting cover plate 3. Based on this, the support connector 4 can be any number of support strips or any number of support blocks, which is not limited by the present disclosure. Furthermore, the support structure may be disposed at an edge or a diagonal line of the spliced unit screen. It should be understood that a position where the support structure is disposed is in a light-emitting area/display area of the spliced unit screen. That is, the support structure supports a light-emitting material. When the support structure is disposed in a non-display area of the spliced unit screen, the support structure may include a light-transmitting material or a non-translucent material. For instance, in the present embodiment, the spliced unit screen is an LCD screen. It should be understood that LCDs have a black periphery. That is, in a non-display area, the support connector 4 is rectangularly donut-shaped. Furthermore, the support connector 4 may be disposed at a periphery of the spliced unit screen, i.e., a black periphery of the spliced unit screen. The support structure may include a light-transmitting material or a non-translucent material. In other embodiments of the present disclosure, the support structure may be support strips oppositely disposed, thereby ensuring balance and stability of the light-transmitting cover plate 3. Specifically, a structure of the support structure is not limited by the present disclosure.

In the embodiment of the present disclosure, an end of the support connector 4 facing the glass cover plate is provided with a first adhesive layer, and an end of the support connector 4 facing the spliced unit screen is provided with a second adhesive layer. Because of the first adhesive layer and the second adhesive layer, a position of the light-transmitting cover plate 3, a position of the spliced unit screen, and a position of the support structure can be confined. It should be understood that a material of the first adhesive layer and a material of the second adhesive layer may be same or different. For example, the material of the first adhesive layer and the material of the second adhesive layer may be waterproof or non-waterproof. Specifically, this can be determined according to actual requirements. If the support structure is disposed in the light-emitting area/display area of the spliced unit screen, the first adhesive layer and the second adhesive layer may include a light-transmitting material. If the support structure is disposed in the non-display area of the spliced unit screen, the first adhesive layer and the second adhesive layer may have a light-emitting material or a non-translucent material.

It should be understood that, in other embodiments of the present disclosure, the first adhesive layer and the second adhesive layer may not be provided. Instead, a middle frame structure is provided to confine a position of the light-transmitting cover plate 3, a position of the spliced unit screen, and a position of the support structure.

In the present embodiment, the light-transmitting cover plate 3 is a glass cover plate having a thickness ranging from 0.25 mm to 0.5 mm, thereby preventing the spliced screen from being overly thick due to an overly thick light-transmitting cover plate. For example, the thickness may be 0.5 mm or 0.45 mm. It should be understood that the thickness range of 0.25 mm to 0.5 mm is only a preferred range provided by the present embodiment, and the thickness of the light-transmitting cover plate 3 of the present disclosure is not limited thereto.

In the present embodiment, the spliced screen 10 is an LCD unit screen 10 including a bottom layer glass, a top layer glass, and an LCD layer disposed between the bottom layer glass and the top layer glass.

The present disclosure provides the spliced screen. By disposing the light-transmitting cover plate 3 on the spliced unit screen, the splicing gap 11 between the unit screens 10 adjacent to each other can be eliminated by the LED strip light 2 without forming an uneven display surface of the spliced screen. Therefore, a technical issue of an entire visual effect of the spliced screen being affected due to a height difference formed between the LED strip light and the spliced unit is prevented. As such, an entire flatness of the spliced screen is improved, and a visual effect is enhanced.

Based on the above embodiments, the present disclosure provides a display device. The display device includes any one of the spliced screens of the above embodiments. It should be understood that the display device may further include a middle frame structure, a power, and a controller. The present disclosure provides the spliced screen. By disposing the light-transmitting cover plate 3 on the spliced unit screen, the splicing gap 11 between the unit screens 10 adjacent to each other can be eliminated by the LED strip light 2 without forming an uneven display surface of the spliced screen. Therefore, a technical issue of an entire visual effect of the spliced screen being affected due to a height difference formed between the LED strip light and the spliced unit is prevented. As such, an entire flatness of the spliced screen is improved, and a visual effect is enhanced.

A spliced screen and a display device have been described in detail with embodiments provided by the present disclosure which illustrates principles and implementations thereof. However, the description of the above embodiments is only for helping to understand the technical solution of the present disclosure and core ideas thereof, and it is understood by those skilled in the art that many changes and modifications to the described embodiment can be carried out without departing from the scope and the spirit of the disclosure that is intended to be limited only by the appended claims.

What is claimed is:

1. A spliced screen, comprising:

a spliced unit screen, wherein the spliced unit screen comprises a plurality of unit screens, and a splicing gap is defined between the spliced units adjacent to each other;

a light-emitting diode (LED) strip light disposed on the splicing gap;

a light-transmitting cover plate disposed above the spliced unit screen; wherein the light-transmitting cover plate comprises a first cover plate area and a second cover plate area, the first cover plate area is defined right above the spliced unit screen, and the second cover plate area is defined right above the LED strip light; and a support connector; wherein a bottom surface of the support connector is directly disposed on the spliced unit screen and a top surface of the support connector contacts and supports the first cover plate area, to define a first gap between a top surface of the spliced unit screen and a bottom surface of the first cover plate area; wherein the second cover plate area is recessed in a thickness side to define a recess, and a second gap is defined between a bottom of the recess and a top surface of the LED strip light; wherein the first gap is equal to the second gap.

2. The spliced screen of claim 1, wherein a height of the support connector relative to the spliced unit screen is not less than a height of the LED strip light relative to the spliced unit screen, and the support connector is disposed at a periphery of the spliced unit screen.

3. The spliced screen of claim 2, wherein the support connector is rectangularly donut-shaped.

4. The spliced screen of claim 1, wherein the top surface of the support connector is provided with a first adhesive layer, and the bottom surface of the support connector is provided with a second adhesive layer.

5. The spliced screen of claim 1, wherein the light-transmitting cover plate is a glass cover plate.

6. The spliced screen of claim 1, wherein the support connector comprises a transparent material.

7. The spliced screen of claim 1, wherein a refractive index of the first cover plate area is equal to a refractive index of the second cover plate area.

8. The spliced screen of claim 1, wherein the spliced screen comprises a position-confining component, the position-confining component is disposed at a periphery of the spliced unit screen, and the light-transmitting cover plate is disposed on a top part of the position-confining component.

9. The spliced screen of claim 1, wherein the support connector comprises a hollow structure.

10. The spliced screen of claim 1, wherein the support connector comprises a plurality of support blocks spaced apart from each other.

11. A display device, comprising the spliced screen of claim 1.

12. A spliced screen, comprising:

a spliced unit screen, wherein the spliced unit screen comprises a plurality of unit screens, and a splicing gap is defined between the spliced units adjacent to each other;

a light-emitting diode (LED) strip light disposed on the splicing gap;

a light-transmitting cover plate disposed above the spliced unit screen; wherein the light-transmitting cover plate comprises a first cover plate area and a second cover plate area, the first cover plate area is defined right above the spliced unit screen, and the second cover plate area is defined right above the LED strip light; and a support connector; wherein a bottom surface of the support connector is directly disposed on the spliced unit screen and a top surface of the support connector contacts and supports the first cover plate area, to define a first gap between a top surface of the spliced unit screen and a bottom surface of the first cover plate area; wherein the second cover plate area is recessed in a thickness side to define a recess, and a second gap is defined between a bottom of the recess and a top surface of the LED strip light; wherein the first gap is equal to the second gap; wherein the light-transmitting cover plate is a glass cover plate, and the support connector comprises a transparent material; and the top surface of the support connector is provided with a first adhesive layer, and the bottom surface of the support connector is provided with a second adhesive layer.

13. The spliced screen of claim 12, wherein the spliced screen comprises a position-confining component, the position-confining component is disposed at a periphery of the spliced unit screen, and the light-transmitting cover plate is disposed on a top part of the position-confining component.

14. The spliced screen of claim 12, wherein a height of the support connector relative to the spliced unit screen is not less than a height of the LED strip light relative to the spliced unit screen, and the support connector is disposed at a periphery of the spliced unit screen.

15. The spliced screen of claim 12, wherein the support connector is rectangularly donut-shaped.

16. The spliced screen of claim 12, wherein a refractive index of the first cover plate area is equal to a refractive index of the second cover plate area.

17. The spliced screen of claim 12, wherein the support connector comprises a hollow structure.

* * * * *